（12）United States Patent
Verma et al.

(10) Patent No.: US 10,416,949 B2
(45) Date of Patent: Sep. 17, 2019

(54) SWITCHING A WIRELESS DISPLAY MODE AND REFRESHING A GRAPHICS PROCESSING UNIT IN AN UNSTABLE STATE

(71) Applicant: QUALCOMM Incorporated, San Diego, CA (US)

(72) Inventors: Lochan Verma, San Diego, CA (US); Mina Ayman Saleh Yanni Makar, San Diego, CA (US); Hongyu Jiang, San Diego, CA (US); Xiaodong Wang, San Diego, CA (US); Vijayalakshmi Raveendran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 497 days.

(21) Appl. No.: 14/863,853

(22) Filed: Sep. 24, 2015

(65) Prior Publication Data

US 2017/0090846 A1    Mar. 30, 2017

(51) Int. Cl.
```
G06T 15/00      (2011.01)
G06F 3/14       (2006.01)
G06T 1/20       (2006.01)
```

(52) U.S. Cl.
CPC .......... *G06F 3/1431* (2013.01); *G06F 3/1454* (2013.01); *G06T 1/20* (2013.01); *G09G 2370/16* (2013.01)

(58) Field of Classification Search
CPC ......... G06T 15/005; G06T 1/20; G06T 15/04; G09G 5/363; G06F 9/3851
USPC .......................................................... 345/522
See application file for complete search history.

(56) References Cited

U.S. PATENT DOCUMENTS

| 2014/0325274 A1 | 10/2014 | Mueller |
| 2015/0235338 A1 | 8/2015 | Alla et al. |
| 2016/0111039 A1* | 4/2016 | Iwami .............. H04N 21/43637 345/520 |
| 2016/0188279 A1* | 6/2016 | Rajamani .............. G06F 3/1454 345/2.3 |

FOREIGN PATENT DOCUMENTS

EP     2890080 A1    7/2015

OTHER PUBLICATIONS

International Search Report and Written Opinion—PCT/US2016/044902—ISA/EPO—Oct. 19, 2016.

* cited by examiner

*Primary Examiner* — Gordon G Liu
(74) *Attorney, Agent, or Firm* — Loza & Loza, LLP

(57) ABSTRACT

Various aspects of the present disclosure provide for detecting a condition indicating that a graphics processing unit (GPU) is in an unstable state while receiving GPU commands in a first wireless display mode, transmitting a GPU refresh request message and switching from the first wireless display mode to a second wireless display mode in response to detecting the condition, receiving data sufficient to reset the GPU from the unstable state to a stable state at a random access point (RAP) in a trace of the GPU commands, and switching from the second wireless display mode to the first wireless display mode after receiving the data. The GPU refresh request message may include information requesting the data sufficient to reset the GPU at an upcoming RAP in the trace of the GPU commands. Various other aspects are also provided throughout the present disclosure.

30 Claims, 8 Drawing Sheets

SWITCHING A WIRELESS DISPLAY MODE AND REFRESHING A GRAPHICS PROCESSING UNIT IN AN UNSTABLE STATE

TECHNICAL FIELD

Aspects of the present disclosure relate, generally, to wireless display and, more particularly, to switching a wireless display mode and refreshing a graphics processing unit (GPU) in an unstable state.

INTRODUCTION

A wireless display system may enable content to be displayed concurrently on multiple devices. Some wireless display systems may include an apparatus sometimes referred to as a source that transmits information to another apparatus sometimes referred to as a sink. Such information may include various types and forms of data. However, there exists a possibility that some of the information is lost during the wireless transmission. Information may be considered lost when such information does not reach the sink and/or reaches the sink in error. If too much information is lost during the wireless transmission, the graphics processing unit (GPU) of the sink may go into an unstable state. In existing systems, the GPU may remain in the unstable state for a considerable period of time and possibly malfunction, thereby resulting in an undesirable user experience. Overcoming such limitations may enhance the overall system and user experience.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect, the present disclosure provides an apparatus configured for wireless display. The apparatus includes a transceiver, a memory, a graphics processing unit (GPU), and at least one processor communicatively coupled to the transceiver, the memory, and the GPU. The at least one processor and the memory are configured to detect a condition indicating that the GPU is in an unstable state while in a first wireless display mode. The at least one processor and the memory are further configured to transmit a GPU refresh request message and switch from the first wireless display mode to a second wireless display mode in response to detecting the condition. The at least one processor and the memory are further configured to receive data sufficient to reset the GPU from the unstable state to a stable state at a random access point (RAP) in a trace of the GPU commands and after transmitting the GPU refresh request message. The at least one processor and the memory are further configured to switch from the second wireless display mode to the first wireless display mode after receiving the data.

In another aspect, the present disclosure provides a method for wireless display. The method includes detecting a condition indicating that the GPU is in an unstable state while in a first wireless display mode. The method also includes transmitting a GPU refresh request message and switching from the first wireless display mode to a second wireless display mode in response to detecting the condition. The method also includes receiving data sufficient to reset the GPU from the unstable state to a stable state at a RAP in a trace of the GPU commands and after transmitting the GPU refresh request message. The method also includes switching from the second wireless display mode to the first wireless display mode after receiving the data.

In yet another aspect, the present disclosure provides a computer-readable medium configured for wireless display. The computer-readable medium includes instructions configured for detecting a condition indicating that the GPU is in an unstable state while in a first wireless display mode. The instructions are further configured for transmitting a GPU refresh request message and switching from the first wireless display mode to a second wireless display mode in response to detecting the condition. The instructions are further configured for receiving data sufficient to reset the GPU from the unstable state to a stable state at a RAP in a trace of the GPU commands and after transmitting the GPU refresh request message. The instructions are further configured for switching from the second wireless display mode to the first wireless display mode after receiving the data.

In a further aspect, the present disclosure provides another apparatus configured for wireless display. The apparatus includes means for detecting a condition indicating that the GPU is in an unstable state while in a first wireless display mode. The apparatus also includes means for transmitting a GPU refresh request message and switching from the first wireless display mode to a second wireless display mode in response to detecting the condition. The apparatus also includes means for receiving data sufficient to reset the GPU from the unstable state to a stable state at a RAP in a trace of the GPU commands and after transmitting the GPU refresh request message. The apparatus also includes means for switching from the second wireless display mode to the first wireless display mode after receiving the data.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
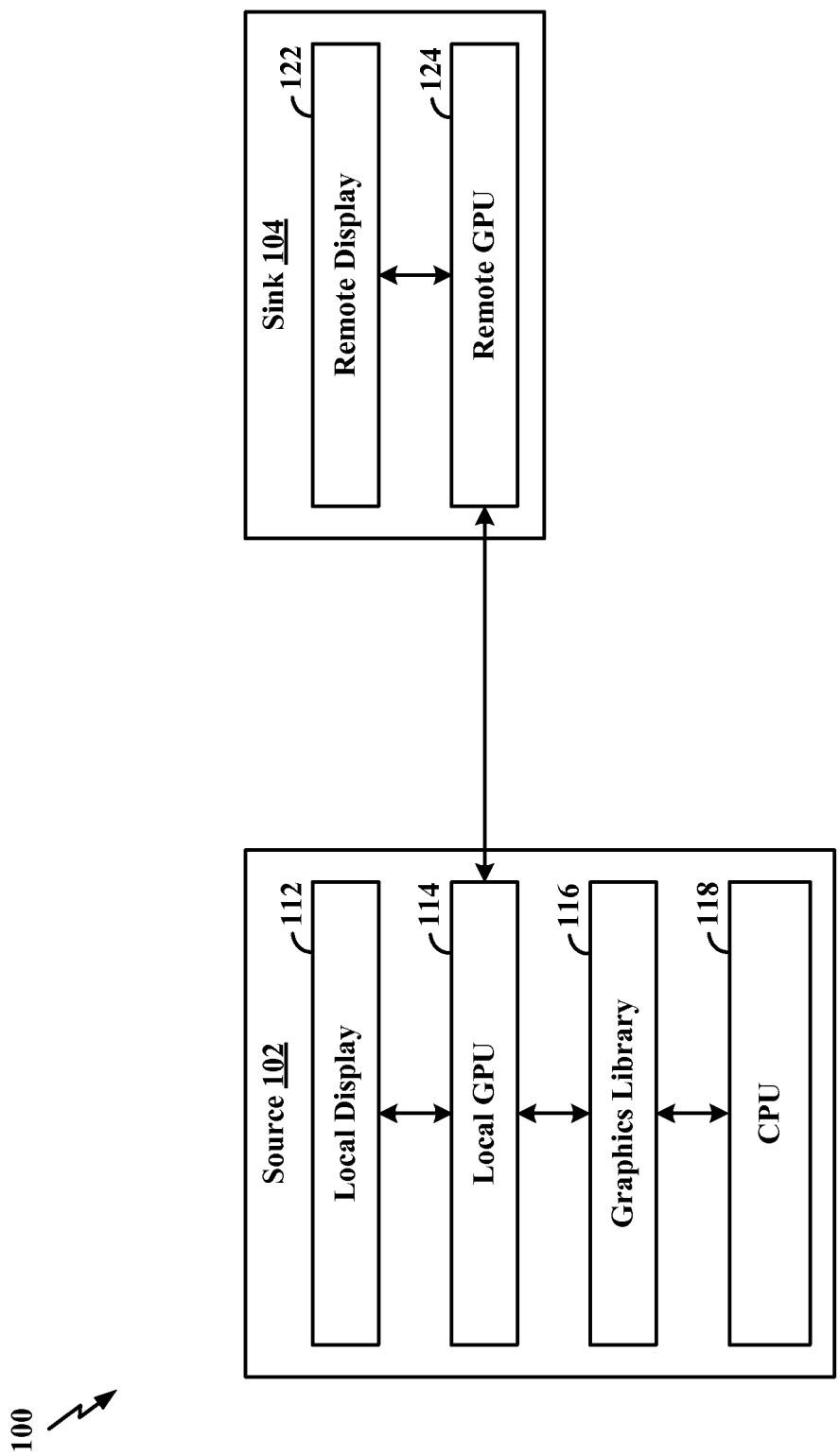
FIG. 1 is a diagram illustrating an example of a source in communication with a sink according to aspects of the present disclosure.

FIG. 1 is a diagram 100 illustrating an example of a source 102 in communication with a sink 104. Generally, the sink 104 is any apparatus configured for wireless communication with another apparatus (e.g., the source 102). Generally, the source 102 is any apparatus configured for wireless communication with another apparatus (e.g., the sink 104). More specifically, the source 102 and the sink 104 may communicate with each other to enable wireless display, as described in greater detail herein. In some configurations, the source 102 may be referred to as a Wi-Fi Display (WFD) source, and the sink 104 may be referred to as a WFD sink. In such configurations, the source 102 and the sink 104 may communicate with each other in accordance with the Wi-Fi Display technical specifications of the Wi-Fi Alliance™. Although various examples of the source 102 and the sink 104 may be described herein, one of ordinary skill in the art will understand that the present disclosure is not limited to such examples and various other examples of the source 102 and the sink 104 are within the scope of the present disclosure.

In some configurations, as illustrated in FIG. 1, the source 102 may include a central processing unit (CPU) 118, a graphics library 116, a local graphics processing unit (GPU) 114, and/or a local display 112. The CPU 118, graphics library 116, local GPU 114, and/or local display 112 may communicate with each other utilizing various technologies without deviating from the scope of the present disclosure. For example, the CPU 118 may generate content at an application layer and such content may be provided to the graphics library 116. The graphics library 116 may store such content. When such content is ready for display, the local GPU 114 may read the content from the graphics library 116. In some circumstances, such content may be displayed on the remote display 122 of the source 102. In such circumstances, the local GPU 114 may provide such content to the local display 112 of the source 102. In some circumstances, such content may be displayed at the sink 104. Display of such content at the sink 104 may be in addition or alternative to display of such content at the source 102. In other words, such content may sometimes be displayed concurrently at the local display 112 and the remote display 122, and such content may sometimes be displayed at either the local display 112 or the remote display 122.

Various techniques may be implemented in order to display the content on the remote display 122 of the sink 104. In some configurations, which may sometimes be referred to as graphics offload, the source 102 transfers GPU commands (or other suitable instructions) to the sink 104. For example, the local GPU 114 of the source 102 may provide GPU commands (or other suitable instructions) to the remote GPU 124 of the sink 104. In such configurations, the GPU commands are processed at the sink 104, and the content corresponding to those GPU commands is displayed on the remote display 122. Generally, the GPU commands may provide the sink 104 with the instructions for executing processes that enable display of such content at the remote display 122 in a manner that is synchronized with display of such content at the local display 112. In some configurations, the GPU commands include OpenGL commands and/or DirectX commands. Graphics offload varies from other techniques, in part, because (i) the source 102 is not required to buffer, encode, and transmit the entire content to be displayed on the remote display 122, and (ii) the sink 104 is not required to receive, decode, and render that entire content.

One of ordinary skill in the art will understand that the term content may generally refer to many types of data without deviating from the scope of the present disclosure. More specifically, with regard to a Graphics Engine Entity (GEE), content may refer to graphics content. Non-limiting examples of graphics content may include productivity applications and/or games. Additionally or alternatively, content may include various other types of data that can be characterized as content or graphics content by one of ordinary skill in the art.

Figure 2:
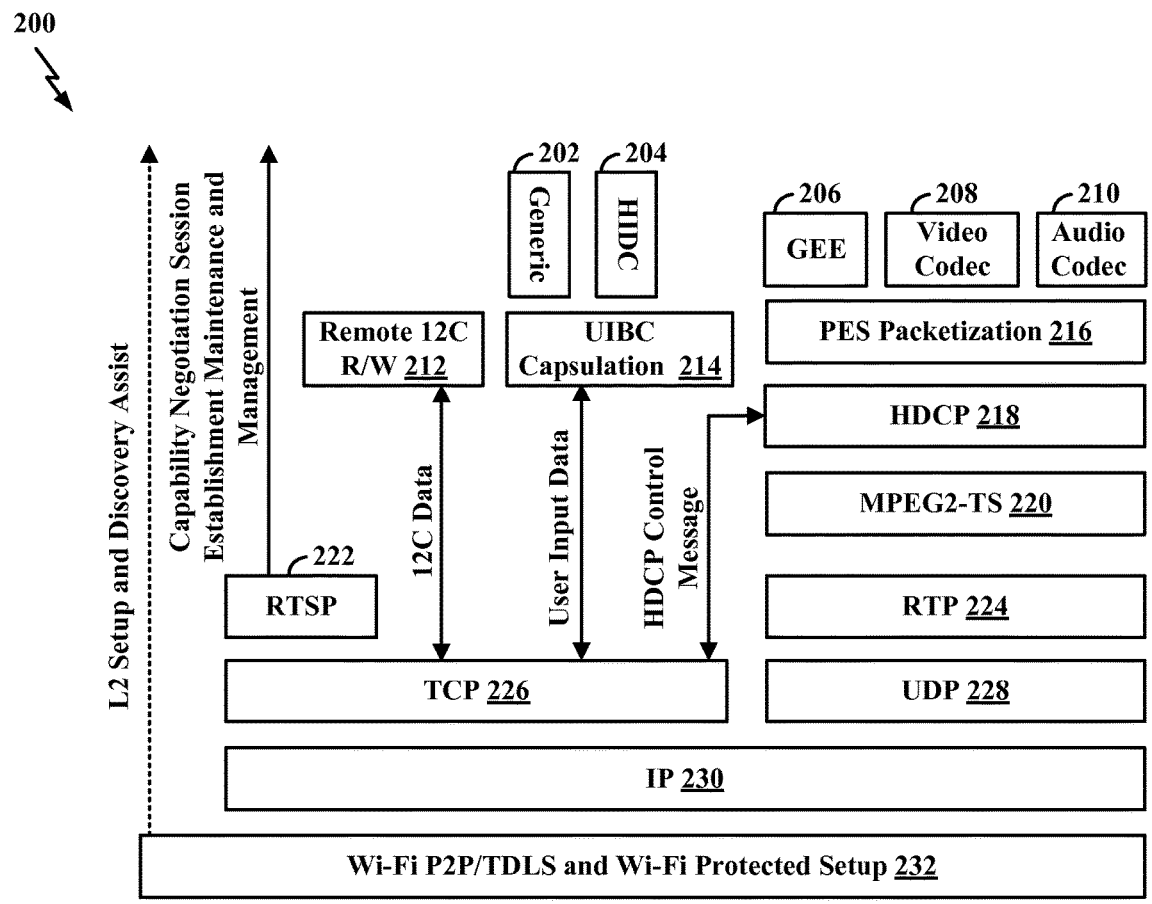
FIG. 2 is a diagram illustrating an example of functional blocks representing a data plane and a control plane according to aspects of the present disclosure.

FIG. 2 is a diagram 200 illustrating an example of functional blocks representing a data plane and a control plane. The data plane may include Video Codec 208, Audio Codec 210, Packetized Elementary Stream (PES) Packetization 216, the High-Bandwidth Digital Content Protection (HDCP) 218, Moving Pictures Experts Group 2 Transport Stream (MPEG2-TS) 220, Real-Time Transport Protocol (RTP) 224, User Datagram Protocol (UDP) 228, and Internet Protocol (230). The control plane may include Real Time Streaming Protocol (RTSP) 222, Transmission Control Protocol (TCP) 226, IP 230, Remote I2C Read/Write 212, User Input Back Channel (UIBC) Capsulation 214, Human Interface Device Class (HIDC) 204, Generic User Input 202, and HDCP 218 session key establishment. The Wi-Fi Peer-2-Peer (P2P)/Tunneled Direct Link Setup (TDLS) block forms Layer-2 connectivity using either Wi-Fi P2P or TDLS. One of ordinary skill in the art has knowledge of the Wi-Fi Display technical specifications of the Wi-Fi Alliance™, which provides detailed description pertaining to the functional blocks illustrated in FIG. 2.

Generally, the GEE 206 is a graphics subsystem that enables graphics offload capabilities. In the example illustrated in FIG. 2, the functional block representing the GEE 206 is shown as located above the PES Packetization 216. However, one of ordinary skill in the art will understand that the functional block representing the GEE 206 may be located in alternative configurations relative to other functional blocks illustrated in FIG. 2 without deviating from the scope of the present location. For example, the functional block representing the GEE 206 may be located directly above the TCP 226. In such configurations, the system may benefit from reduced overhead and/or latency because data from the GEE 206 could pass directly to the IP 230 without passing through the PES packetization 216, HDCP 218, MPEG2-TS 220, RTP 224, and UDP 228.

The source 102 and the sink 104 may communicate with each other utilizing various technologies without deviating from the scope of the present disclosure. In some configurations, the source 102 and the sink 104 may communicate with each other utilizing a TCP/IP connection. In such configurations, the source 102 transmits TCP packets to the sink 104. In some configurations, the source 102 and the sink 104 may communicate with each other utilizing a UDP/IP connection. In such configurations, the source 102 transmits UDP packets to the sink 104. In some configurations, the source 102 and the sink may communicate with each other utilizing a non-IP connection, which may sometimes be referred to as a native Medium Access Control (MAC) connection. In such configurations, the source 102 transmits native MAC packets to the sink 104.

Figure 3:
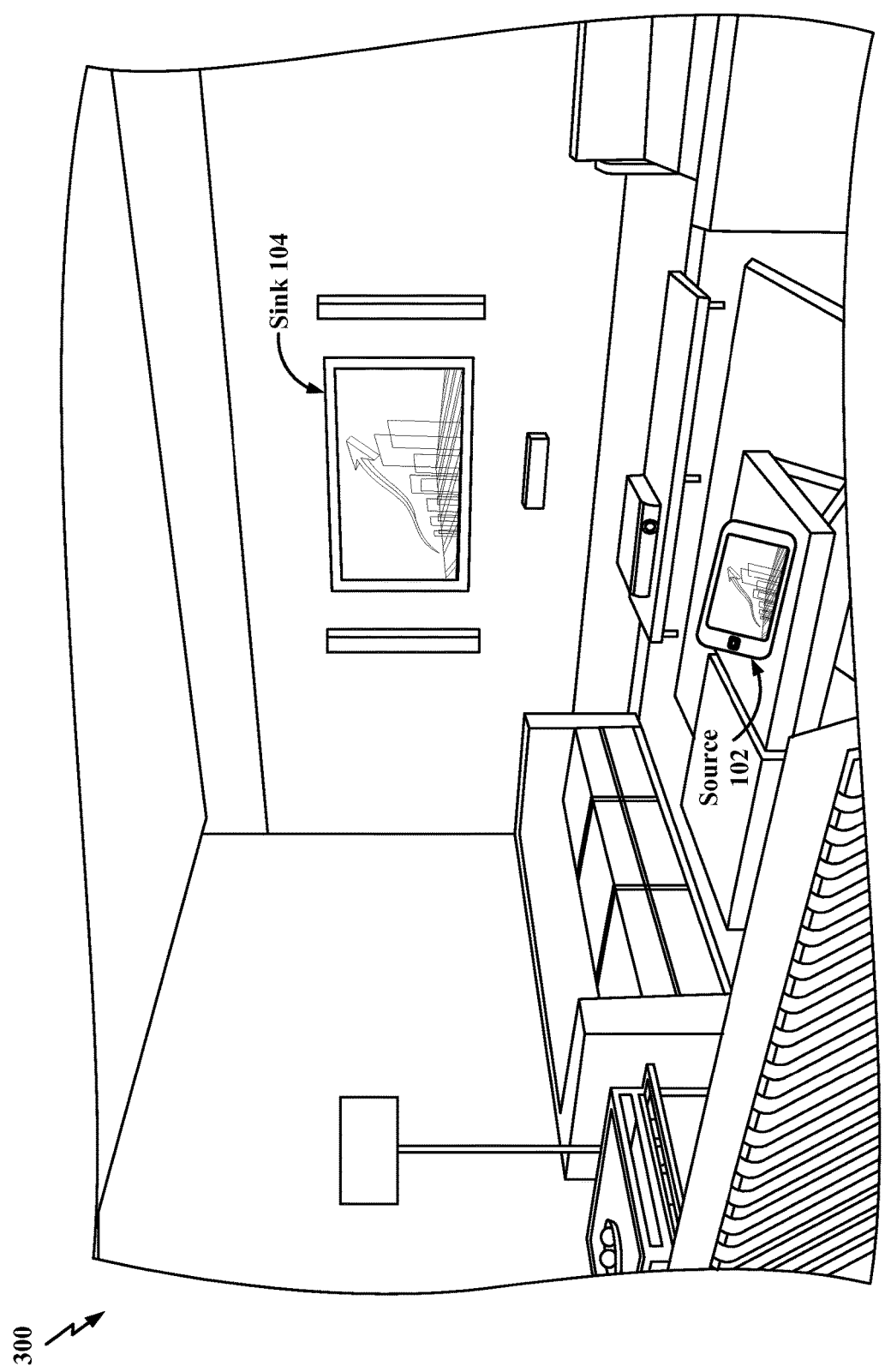
FIG. 3 is a diagram illustrating an example of the source and the sink displaying content in a home environment according to aspects of the present disclosure.
Figure 4:
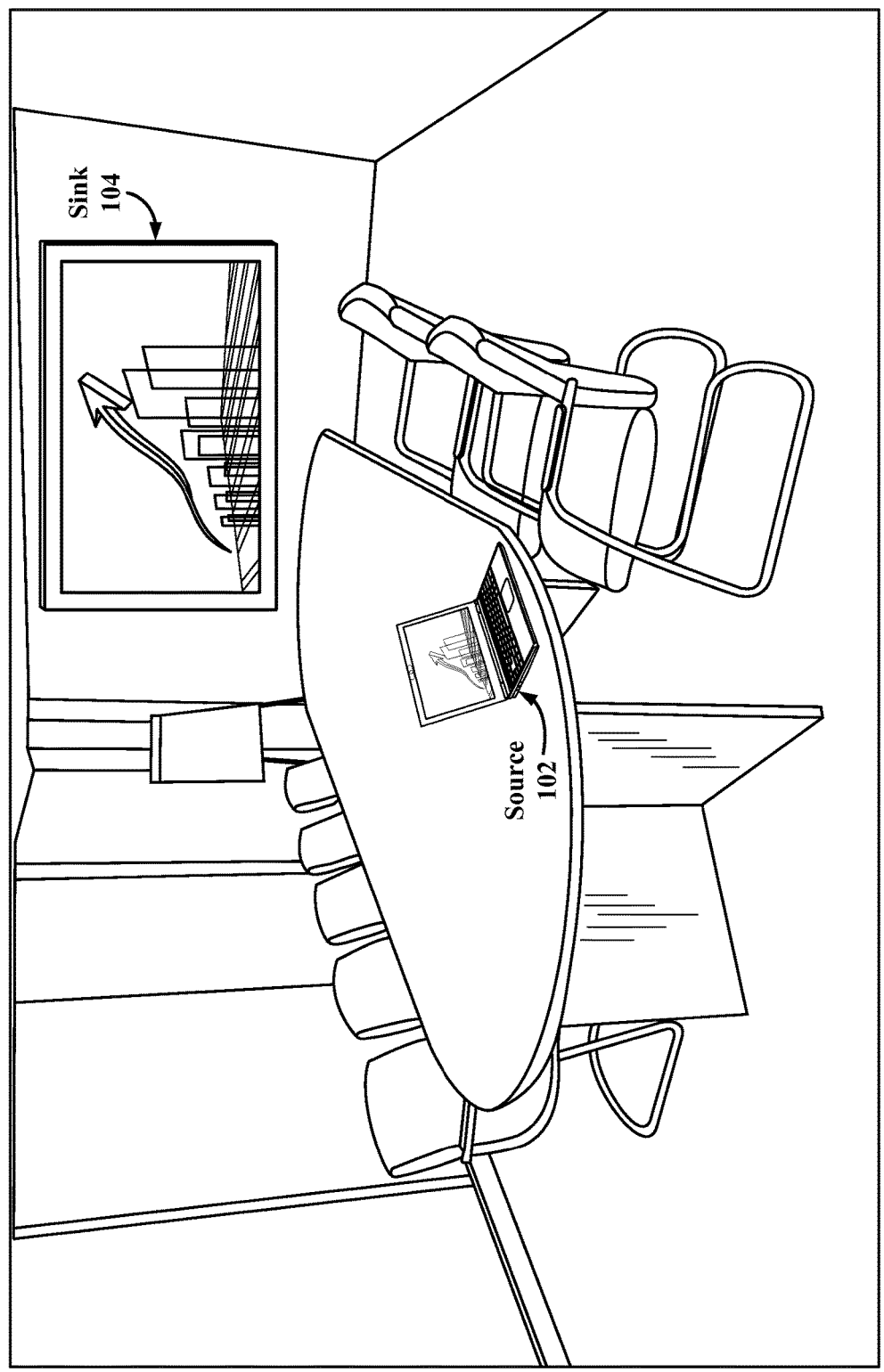
FIG. 4 is a diagram illustrating an example of the source and the sink displaying content in a work environment according to aspects of the present disclosure.

FIG. 3 is a diagram 300 illustrating an example of the source 102 and the sink 104 displaying content in a home environment. FIG. 4 is a diagram 400 illustrating an example of the source 102 and the sink 104 displaying content in a work environment. As illustrated in the examples provided in FIGS. 3 and 4, the content displayed on the sink 104 may be synchronized with the content displayed on the source 102. Additional description pertaining to the source 102 and sink 104 is provided throughout the present disclosure and therefore will not be repeated here.

Figure 5:
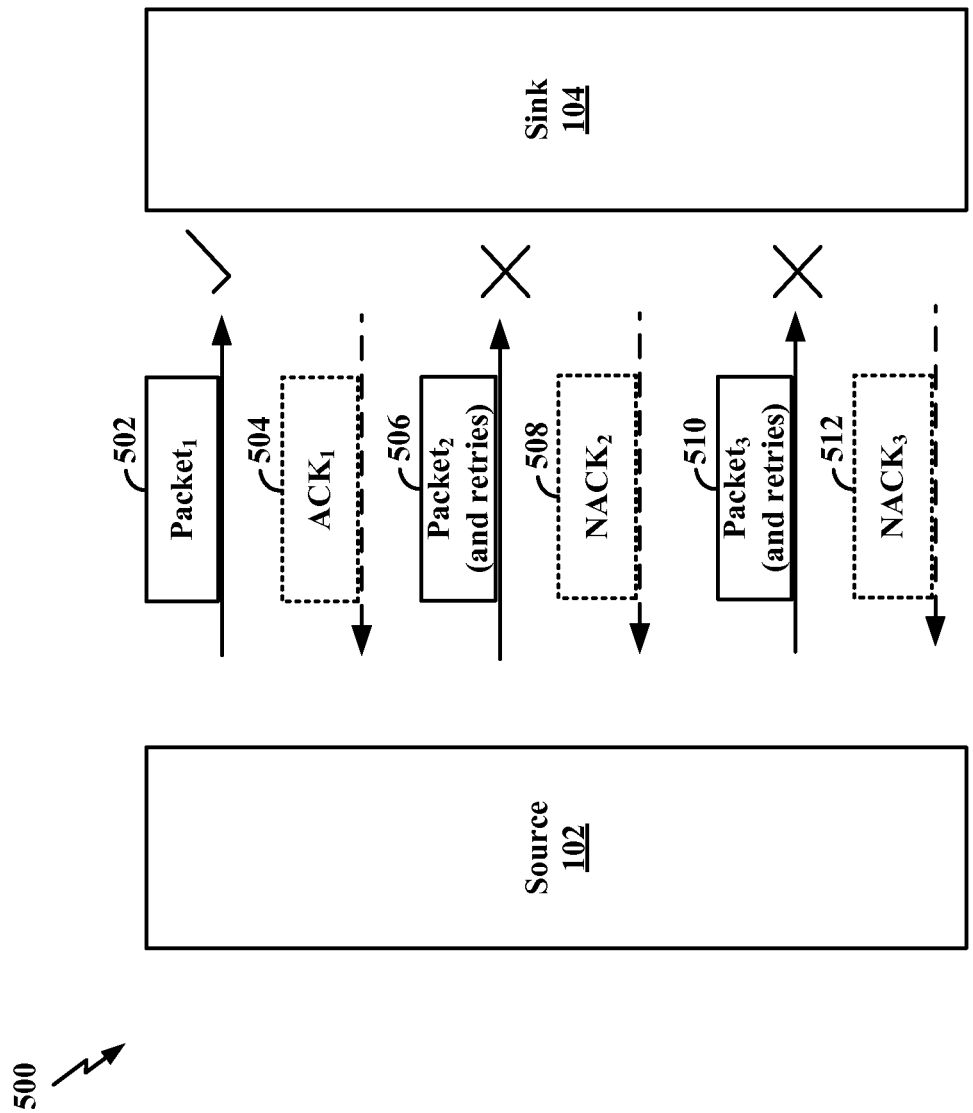
FIG. 5 is a diagram illustrating an example of various communications between the source and the sink according to aspects of the present disclosure.

FIG. 5 is a diagram 500 illustrating an example of various communications between the source 102 and the sink 104. As described above, the source 102 may transfer GPU commands (or other suitable instructions) to the sink 104. The GPU commands are processed at the sink 104, and the content corresponding to those GPU commands is displayed on the remote display 122. The GPU commands may provide the sink 104 with the instructions for executing processes that enable display of such content at the sink 104 in a manner that is synchronized with display of such content at the source 102. In some configurations, the GPU commands include OpenGL commands and/or DirectX commands. The GPU commands may be included in various types and forms of packets without deviating from the scope of the present disclosure. In some configurations, the GPU commands may be included as a portion of the payload in TCP/IP packets, UDP/IP packets, and/or native MAC packets, as described above. In the example illustrated in FIG. 5, some of the GPU commands are included in Packet$_1$ 502. The source 502 transmits Packet$_1$ 502, and Packet$_1$ 502 is received at the sink 104 without error. Accordingly, in some configurations, the sink 104 transmits an acknowledgement message (ACK$_1$ 504) to the source 102.

In wireless communication, however, there is a possibility that some packets may be lost during transmission. More specifically, in some circumstances, one or more packets containing GPU commands may not be received at the sink 104 and/or may be received at the sink 104 with errors. When a packet containing GPU commands is not received at the sink 104 and/or is received at the sink 104 with errors, that packet may be referred to herein as a lost packet. For example, as illustrated in FIG. 5, the sink 104 transmits Packet$_2$ 506, which contains GPU commands. However, Packet$_2$ 506 is not received at the sink 104 and/or is received at the sink 104 with errors. In some configurations, the sink 104 may transmit a negative acknowledgement message (NACK$_2$ 508) to the source 102. In some cases, the absence of an ACK during a period of time following transmission of Packet$_2$ 506 may be considered an implicit indication of a NACK. Accordingly, in such cases, the NACK$_2$ 508 is not required because it is implicitly inferred from the absence of the ACK. The source 102 may then retry the transmission of Packet$_2$ 506. Subsequent packets may also be unable to reach the sink 104 and/or reach the sink 104 with errors. For example, as illustrated in FIG. 5, the sink 104 transmits Packet$_3$ 510, which contains GPU commands. However, Packet$_3$ 510 is not received at the sink 104 and/or is received at the sink 104 with errors. In some configurations, the sink 104 may transmit a negative acknowledgement message (NACK$_3$ 512) to the source 102. In some cases, the absence of an ACK during a period of time following transmission of Packet$_3$ 510 may be considered an implicit indication of a NACK. Accordingly, in such cases, the NACK$_3$ 512 is not required because it is implicitly inferred from the absence of the ACK. The source 102 may then retry the transmission of Packet$_3$ 510.

As mentioned above, a lost packet refers to a packet that contains GPU commands and is not received at the sink 104 and/or is received at the sink 104 with errors. The remote GPU 124 of the sink 104 may be in an unstable state when the number of lost packets of GPU commands exceeds a threshold number of lost packets of GPU commands. The remote GPU 124 of the sink 104 may be in an unstable state for various other reasons without deviating from the scope of the present disclosure. As an example, the remote GPU 124 may be in an unstable state when the remote GPU 124 malfunctions as a result of not receiving one or more GPU commands. Malfunctions may result in inoperability and/or crash of the remote GPU 124. As another example, the remote GPU 124 of the sink 104 may be in an unstable state when the remote GPU 124 is unable to perform one or more critical functions of the sink 104. A critical function may refer to any function that is central to the operability of a particular component of the sink 104. As yet another example, the sink 104 may be in an unstable state when the remote GPU 124 is unable to operate in a manner that allows content to be displayed on the remote display 122 of the sink 104. As a further example, the sink 104 may be in an unstable state when the remote GPU 124 is unable to properly synchronize the display of content on the remote display 122 of the sink 104 with the content being displayed on the local display 112 of the source 102.

In existing systems, the remote GPU 124 may be unable to recover from such an unstable state for a considerable period of time and, thus, may be unable to properly display the content corresponding to the GPU commands being sent from the source 102 to the sink 104. For example, the sink 104 may be unable to properly synchronize the display of content on the remote display 122 of the sink 104 with the content being displayed on the local display 112 of the source 102. In such circumstances, existing systems may remain in the unstable state for a considerable period of time and possibly malfunction, fail to perform critical functions, become inoperative, crash, hang, freeze, and/or otherwise provide in an undesirable user experience. Overcoming such limitations may enhance the overall system and user experience.

Figure 6:
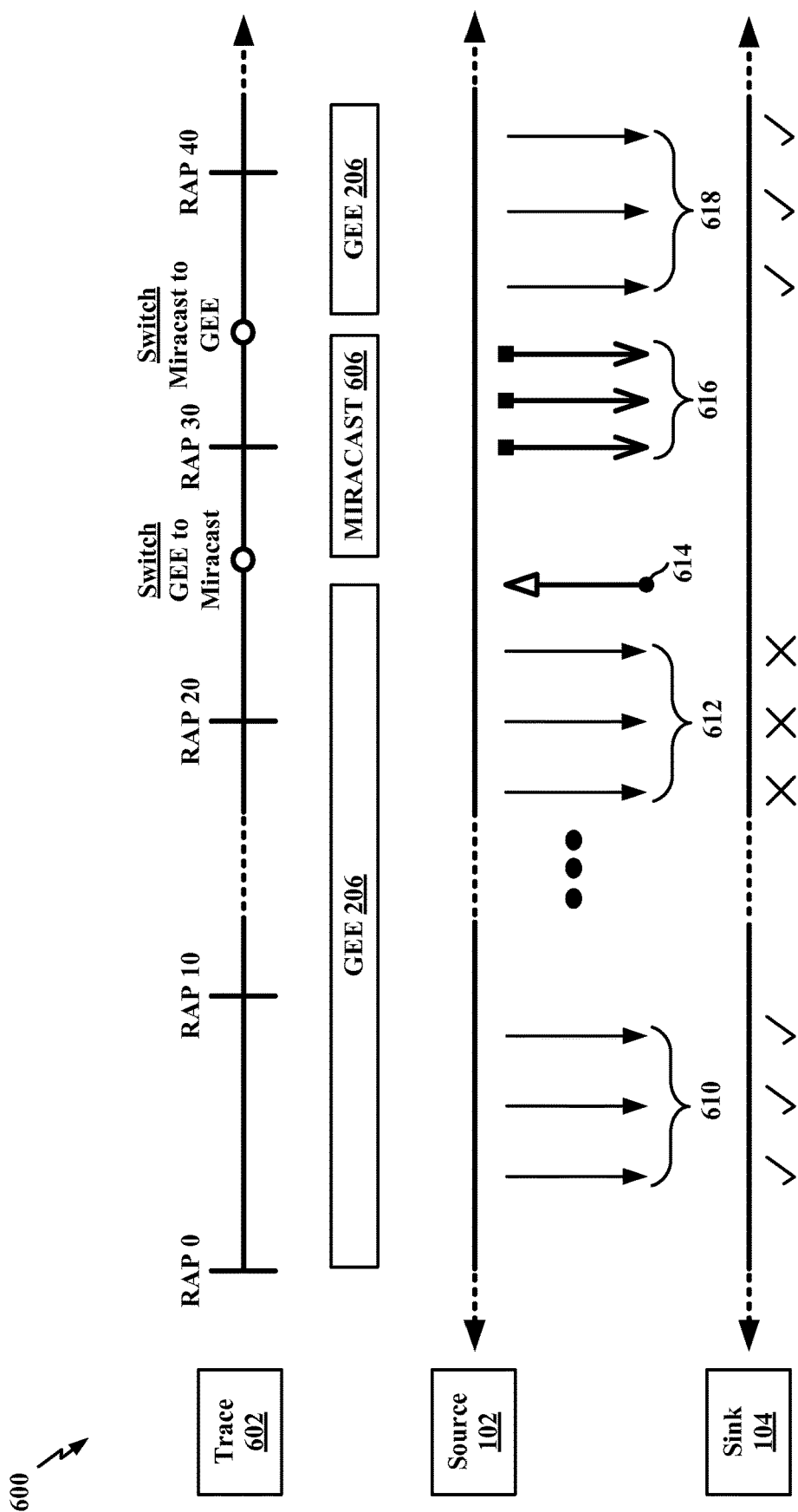
FIG. 6 is a diagram illustrating another example of various communications between the source and the sink according to aspects of the present disclosure.

FIG. 6 is a diagram 600 illustrating an example of various communications between the source 102 and the sink 104.

The source 102 and the sink 104 may be configured to operate utilizing at least two wireless display modes. An example of a first wireless display mode includes the utilization of the GEE 206. As described above, the GEE 206 is a graphics subsystem that enables graphics offload capabilities. In some configurations, the GPU commands may be referred to as GEE frames, GEE packets, and/or any other suitable term without deviating from the scope of the present disclosure. GEE 206 may sometimes be referred to as graphics domain wireless display without deviating from the scope of the present disclosure. In graphics domain wireless display, display data may be captured as OpenGL and/or DirectX calls to the GPU. In graphics domain wireless display, content capture is application-agnostic. In graphics domain wireless display, content capture may occur at the entry of the GPU. In graphics domain wireless display, the pixels may be regenerated at the sink 104 to achieve lossless graphics and text quality. In graphics domain wireless display, the transmitted data may be scaled to the required resolution (e.g., 2K, 2080p, 4K, etc.) with little to no addition to the transmission data rate.

An example of a second wireless display mode includes the utilization of Miracast 604. Generally, Miracast refers to protocols that comply with the Wi-Fi Display technical specifications of the Wi-Fi Alliance™. Such protocols enable connectivity between the source 102 and the sink 104. Miracast may sometimes be referred to as High-Definition Multimedia Interface (HDMI) over Wi-Fi. Miracast enables synchronized display of contents from one device (e.g., the source 102) onto another device (e.g., the sink 104). Miracast may also be referred to as pixel domain wireless display without deviating from the scope of the present disclosure. In pixel domain wireless display, content capture may occur after entry of the GPU. In pixel domain wireless display, some content (e.g., images) may be captured from the display frame buffer in the pixel domain after GPU rendering, and some content (e.g., non-images) may be captured at a display processor of the source 102. In pixel domain wireless display, display data may be compressed, and up-sampling transmitted display data at the sink 104 may reduce the quality of text and graphics.

Some packets described herein (e.g., packets 610, 612, 618) may sometimes be referred to as GEE packets, or another suitable term, without deviating from the scope of the present disclosure. While operating in the first wireless display mode (e.g., using GEE 206), the source 102 transmits one or more packets 610 containing GPU commands to the sink 104. Over time, one or more other packets 612 may be lost during the transmission. As mentioned above, a lost packet refers to a packet that contains GPU commands and is not received at the sink 104 and/or is received at the sink 104 with errors. The sink 104 is configured to detect one or more conditions indicating that the remote GPU 124 of the sink 104 is in an unstable state. In some configurations, the sink 104 may detect that the remote GPU 124 is in an unstable state upon detecting that the number of lost packets of GPU commands exceeds a threshold number of lost packets of GPU commands. One of ordinary skill in the art will understand that the threshold number of lost packets of GPU commands may be set by an administrator, preconfigured by the manufacturer, dynamically adjusted based on various factors, and/or determined utilizing many different techniques without deviating from the scope of the present disclosure. As an example, the threshold number of lost packets may be preset as two (2) packets. As illustrated in FIG. 6, the sink 104 may detect that the remote GPU 124 is in an unstable state upon detecting that three (3) packets 612 containing GPU commands were lost.

In response to detecting that the remote GPU 124 is in an unstable state, the sink 104 may transmit a GPU refresh request message 614 (to the source 102) and switch from the first wireless display mode (e.g., using GEE 206) to a second wireless display mode (e.g., using Miracast 606). In some configurations, the GPU refresh request message 614 may be referred to as a GPU reset message, or any other suitable term, without deviating from the scope of the present disclosure. The switch from the first wireless display mode (e.g., using GEE 206) to the second wireless display mode (e.g., using Miracast 606) enables the sink 104 to fallback to a mode of wireless display that is not suffering from lost packets containing GPU commands.

Some encoders may have error recovery mechanisms that enable graceful degradation of the displayed content. For example, upon detecting a certain number of lost packets, such encoders may reduce the number of transmitted packets, thereby enabling a gradual reduction in the quality of the displayed content. However, reducing the number of transmitted packets may not be feasible for graphics offload. In graphics offload, a substantial reduction in the number of transmitted packets (containing GPU commands) can adversely impact the state of the remote GPU 124 of the sink 104.

Without such a fallback, the remote GPU 124 of the sink 104 may remain in the unstable state and possibly malfunction, fail to perform critical functions, become inoperative, crash, hang, freeze, and/or otherwise provide in an undesirable user experience. One of ordinary skill in the art will understand that the severity of the impact may depend upon the priority or importance of the lost function, the application to which that lost GPU command is associated, the behavior of the graphics library to which that lost GPU command is associated, and/or various other factors.

One of ordinary skill in the art will also understand that the specific techniques implemented to enable such a fallback can vary without deviating from the scope of the present disclosure. Although many examples of such techniques exist, one example may involve: (i) determining an identifier (ID) (e.g., Stream ID and/or Session ID) associated with content for display, (ii) using the ID, establishing a session using GEE 206 and a session using Miracast 606 (e.g., prior to receiving packets 610 containing the GPU commands), (iii) subsequently setting the session using Miracast 606 to 'pause' and setting the session using GEE 206 to 'play' (e.g., while receiving the packets 610 containing the GPU commands), and (iv) to initiate the fallback, setting the session using Miracast 606 to 'play' and setting the session using GEE 206 to 'pause.'

This fallback may occur even though the display quality of the second wireless display mode (e.g., using Miracast 606) may be less than the display quality of the first wireless display mode (e.g., using GEE 206). Display quality may refer to the display resolution, refresh rate, picture quality, and/or any other metric associated with the display quality of the content on the remote display 122 of the sink 104. Even though the display quality of the second wireless display mode (e.g., using Miracast 606) may be less than the display quality of the first wireless display mode (e.g., using GEE 206), the user is provided with a viewing experience that is not interrupted as a result of lost packets containing GPU commands and/or a GPU in an instable state.

The GPU refresh request message 614 may include information requesting data 616 for resetting the remote GPU 124 of the sink 104. More specifically, in some configurations, the GPU refresh request message 614 may include information requesting data 616 that is sufficient to reset the remote GPU 124 of the sink 104 at an upcoming random access point (RAP) in a trace 602 of the GPU commands. The data 616 may sometimes be referred to as Miracast frames, Miracast packets, and/or other suitable terms without deviating from the scope of the present disclosure. Generally, resetting any GPU may include reinitializing settings, configurations, or conditions of the GPU such that the GPU changes from the unstable state to a stable state. Additional description pertaining to an unstable state is provided above and therefore will not be repeated. A stable state refers to any state that is different from the unstable state. For example, a GPU may be in a stable state when that GPU performs one or more critical functions that it was unable to perform while in the unstable state.

Generally, the trace 602 of the GPU commands refers to a record or file containing all (or substantially all) of the GPU commands transmitted by the source 102 and/or received at the sink 104. The trace 602 of the GPU commands may be stored or maintained in a graphics library of the sink 104. The trace 602 of the GPU commands may be stored in various formats and/or file configurations without deviating from the scope of the present disclosure. Generally, a RAP refers to a mark, marker, and/or any other suitable indicator at one or more portions, positions, and/or locations of the trace 602. In some configurations, the trace 602 may be transmitted from the source 102 to the sink 104. The trace 602 may include a plurality of RAPs (e.g., RAP 0, RAP 10, RAP 20, RAP 30, and RAP 40, as illustrated in FIG. 6).

At each RAP, the sink 104 may receive data 616 that is sufficient to reset the remote GPU 124. In some configurations, such data 616 may sometimes be referred to as GEE information, or any other suitable term, without deviating from the scope of the present disclosure. In some configurations, the data 616 is sufficient to reset the remote GPU 124 without requiring other data associated with another RAP in the trace 602 of the GPU commands. In other words, the data 616 is independent of other data associated with a preceding RAP (e.g., RAP 0, RAP 10, RAP 20) in the trace 602 of the GPU commands. For example, $RAP_N$ is independent of $RAP_{N-1}$. In this example, the remote GPU 124 may be reset at $RAP_N$ without requiring any information available at $RAP_{N-1}$. As such, each RAP may be thought of as being 'memory-less' (e.g., not requiring information from, nor dependent on, any preceding RAP). However, because the data 616 may be considerable in quantity, thereby introducing peaks in the over-the-air transmission thereof, such data 616 may not be transmitted unless required for error recovery.

Referring to the example illustrated in FIG. 6, the upcoming RAP (after the sink 104 transmits the GPU refresh request message 614 to the source 102) is RAP 30. At RAP 30, the source 102 transmits data 616 that is sufficient to reset the remote GPU 124 of the sink 104 from the unstable state to the stable state. As described above, resetting the remote GPU 124 of the sink 104 may include altering settings, configurations, or conditions of the remote GPU 124 such that the remote GPU 124 changes from the unstable state to the stable state. In some configurations, the data for resetting the remote GPU 124 of the sink 104 may include information associated with the textures, shaders, vertices, and/or any other suitable display attributes.

After receiving the data 616 that is sufficient to reset the remote GPU 124 of the sink 104 from the unstable state to the stable state, the sink 104 may switch from the second wireless display mode (e.g., using Miracast 606) to the first wireless display mode (e.g., using GEE 206). Because the remote GPU 124 of the sink 104 is reset from the unstable state to the stable state, the remote GPU 124 of the sink 104 is capable of receiving additional packets 618 containing GPU commands while operating in the first wireless display mode (e.g., using GEE 206). One of ordinary skill in the art will understand that the specific techniques implemented to enable such a switch can vary without deviating from the scope of the present disclosure. Although many examples of such techniques exist, one example may involve setting the session using Miracast 606 to 'pause' and setting the session using GEE 206 to 'play.'

Although the switch from the second wireless display mode (e.g., using Miracast 606) to the first wireless display mode (e.g., using GEE 206) can occur any time after receiving the data 616 sufficient to reset the remote GPU 124 of the sink 104, the exact time at which the switch occurs can vary based on various implementations without deviating from the scope of the present disclosure. As described above, a considerable amount of time may be utilized for transmitting such data 616 prior to performing the switch from the second wireless display mode (e.g., using Miracast 606) to the first wireless display mode (e.g., using GEE 206). Accordingly, the switch from the second wireless display mode (e.g., using Miracast 606) to the first wireless display mode (e.g., using GEE 206) may occur after a period of time following the beginning of the transmission of such data 616. A reason for performing this switch after a period of time (e.g., not instantaneously upon transmitting the data 616) is that an earlier portion of that data 616 contains information for resetting the remote GPU 124 of the sink 104 and a later portion of that data 616 contains the GPU commands corresponding to the content that will be rendered (nearly immediately) on the remote display 122 of the sink 104. That later portion of the data 616 may sometimes be referred to as screen content commands, screen content GPU commands, or any other suitable term without deviating from the scope of the present disclosure. Accordingly, in some configurations, the switch from the second wireless display mode (e.g., using Miracast 606) to the first wireless display mode (e.g., using GEE 206) occurs when the timestamp of a packet (e.g., data 616, which may sometimes be referred to as a Miracast frame/packet) associated with the second wireless display mode (e.g., using Miracast 606) is the same as a timestamp of a packet (e.g., packet 618, which may sometimes be referred to as a GEE frame/packet) associated with the first wireless display mode (e.g., using GEE 206).

Figure 7:
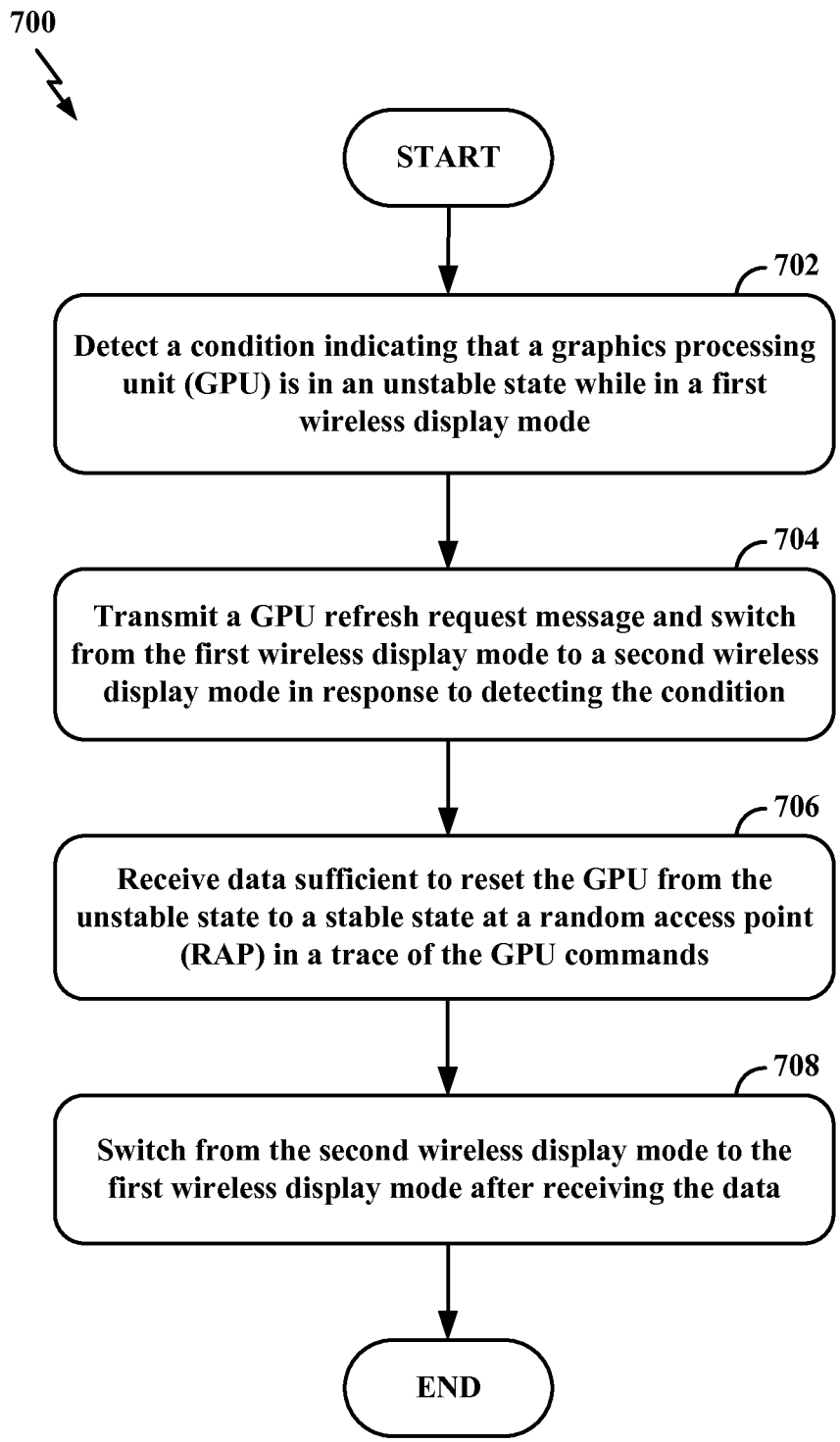
FIG. 7 is a diagram illustrating an example of various methods and/or processes operable at an apparatus according to aspects of the present disclosure.

FIG. 7 is a diagram 700 illustrating an example of various processes that may occur at an apparatus. In some configurations, such an apparatus is the sink 104 described in greater detail herein. At block 702, the apparatus may detect a condition indicating that a GPU is in an unstable state while in a first wireless display mode. For example, referring to FIG. 6, the sink 104 may detect one or more conditions indicating that the remote GPU 124 of the sink 104 is in an unstable state while receiving GPU commands in a first wireless display mode (e.g., using GEE 206). In some configurations, the sink 104 may detect that the remote GPU 124 is in an unstable state upon detecting that the number of lost packets of GPU commands exceeds a threshold number of lost packets of GPU commands. For example, the threshold number of lost packets may be preset as two (2) packets. As illustrated in FIG. 6, the sink 104 may detect that the remote GPU 124 is in an unstable state upon detecting that three (3) packets 612 containing GPU commands were lost.

At block 704, in response to detecting the condition, the apparatus may transmit a GPU refresh request message and switch from the first wireless display mode to a second wireless display mode. For example, referring to FIG. 6, in response to detecting that the remote GPU 124 is in an unstable state, the sink 104 may transmit a GPU refresh request message 614 and switch from the first wireless display mode (e.g., using GEE 206) to a second wireless display mode (e.g., using Miracast 606). The switch from the first wireless display mode (e.g., using GEE 206) to the second wireless display mode (e.g., using Miracast 606) enables the sink 104 to fallback to a mode of wireless display that is not suffering from lost packets containing GPU commands. Without such a fallback, the remote GPU 124 of the sink 104 may remain in the unstable state and possibly malfunction, fail to perform critical functions, become inoperative, crash, hang, freeze, and/or otherwise provide in an undesirable user experience.

At block 706, the apparatus may receive data sufficient to reset the GPU from the unstable state to a stable state at a RAP in a trace of the GPU commands and after transmitting the GPU refresh request message. For example, referring to FIG. 6, the RAP after the sink 104 transmits the GPU refresh request message 614 to the source 102 is RAP 30. At RAP 30, the source 102 transmits data 616 that is sufficient to reset the remote GPU 124 of the sink 104 from the unstable state to the stable state. As described above, resetting the remote GPU 124 of the sink 104 may include altering settings, configurations, or conditions of the remote GPU 124 such that the remote GPU 124 changes from the unstable state to the stable state. Additional description pertaining to the unstable state is provided above and therefore will not be repeated. A stable state refers to any state that is different from the unstable state. For example, a GPU may be in a stable state when that GPU performs one or more critical functions that it was unable to perform while in the unstable state.

At block 708, after receiving the aforementioned data, the apparatus may switch from the second wireless display mode to the first wireless display mode. In some configurations, the apparatus is configured to utilize GEE 206 in the first wireless display mode and Miracast 606 in the second wireless display mode. Referring to FIG. 6, after receiving the data 616 sufficient to reset the remote GPU 124 of the sink 104 from the unstable state to the stable state, the sink 104 may switch from the second wireless display mode (e.g., using Miracast 606) to the first wireless display mode (e.g., using GEE 206). Because the remote GPU 124 of the sink 104 is reset from the unstable state to the stable state, the remote GPU 124 of the sink 104 is capable of receiving additional packets 618 containing GPU commands while operating in the first wireless display mode (e.g., using GEE 206).

The methods and/or processes described with reference to FIG. 7 are provided for illustrative purposes and are not intended to limit the scope of the present disclosure. The methods and/or processes described with reference to FIG. 7 may be performed in sequences different from those illustrated therein without deviating from the scope of the present disclosure. Additionally, some or all of the methods and/or processes described with reference to FIG. 7 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Figure 8:
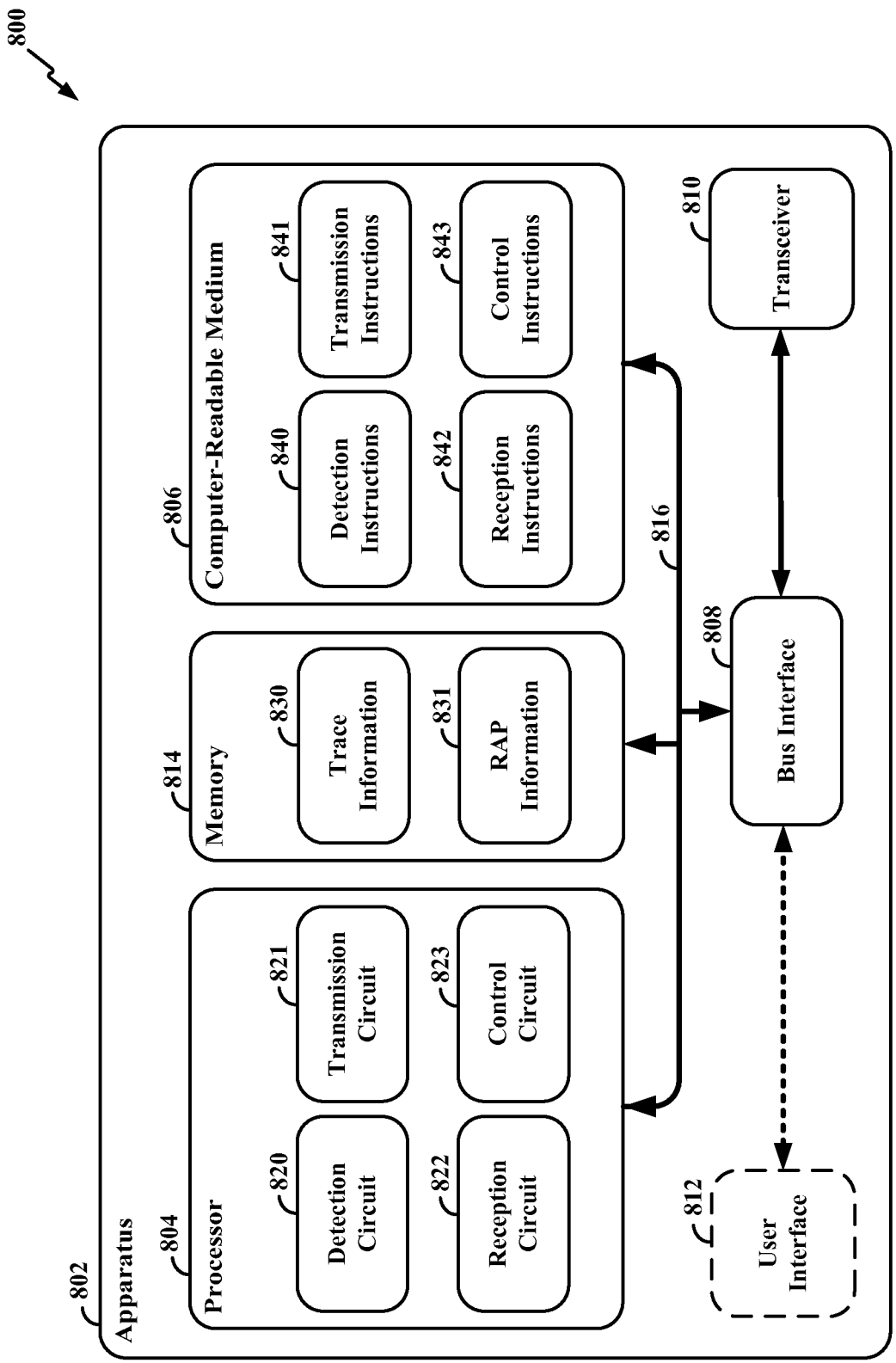
FIG. 8 is a diagram illustrating an example of a hardware implementation of an apparatus according to aspects of the present disclosure.

FIG. 8 is a diagram 800 illustrating an example of a hardware implementation of an apparatus 802 according to various aspects of the present disclosure. Generally, the apparatus 802 may be any device configured for enabling wireless display capabilities. In some configurations, the apparatus 802 may be the sink 104 described above. The apparatus 802 may include a user interface 812. The user interface 812 may be configured to receive one or more inputs from a user of the apparatus 802. The user interface 812 may also be configured to display information (e.g., text and/or images) to the user of the apparatus 802. The user interface 812 may exchange data via the bus interface 808.

The apparatus 802 may also include a transceiver 810. The transceiver 810 may be configured to receive data and/or transmit data in communication with another apparatus. The transceiver 810 provides a means for communicating with another apparatus via a wired or wireless transmission medium. For example, the transceiver 810 may provide the means for communicating with the source 102, as described in greater detail above. The transceiver 810 may be configured to perform such communications using various types of technologies, as described in greater detail above. One of ordinary skill in the art will understand that many types of technologies may perform such communication without deviating from the scope of the present disclosure.

The apparatus 802 may also include a memory 814, one or more processors 804, a computer-readable medium 806, and a bus interface 808. The bus interface 808 may provide an interface between a bus 816 and the transceiver 810. The memory 814, the one or more processors 804, the computer-readable medium 806, and the bus interface 808 may be connected together via the bus 816. The processor 804 may be communicatively coupled to the transceiver 810 and/or the memory 814.

The processor 804 may include a detection circuit 820. The detection circuit 820 may include various hardware components and/or may perform various algorithms that provide the means for detecting a condition indicating that a GPU is in an unstable state while in a first wireless display mode. The processor 804 may also include a transmission circuit 821. The transmission circuit 821 may include various hardware components and/or may perform various algorithms that provide the means for transmitting a GPU refresh request message and switching from the first wireless display mode to a second wireless display mode in response to detecting the condition. The processor 804 may also include a reception circuit 822. The reception circuit 822 may include various hardware components and/or may perform various algorithms that provide the means for receiving data sufficient to reset the GPU from the unstable state to a stable state at a RAP in a trace of the GPU commands and after transmitting the GPU refresh request message. The processor 804 may also include a control circuit 823. The control circuit 823 may include various hardware components and/or may perform various algorithms that provide the means for switching from the second wireless display mode to the first wireless display mode after receiving the data. The control circuit 823 may include various hardware components and/or may perform various algorithms that provide the means for utilizing a GEE in the first wireless display mode and Miracast in the second wireless display mode.

The foregoing description provides a non-limiting example of the processor 804 of the apparatus 802. Although various circuits have been described above, one of ordinary skill in the art will understand that the processor 804 may also include various other circuits (not shown) that are in addition and/or alternative(s) to circuits 820, 821, 822, 823. Such other circuits (not shown) may provide the means for performing any one or more of the functions, methods, processes, features and/or aspects described herein.

The computer-readable medium 806 may include various computer-executable instructions. The computer-executable instructions may include computer-executable code configured to perform various functions and/or enable various aspects described herein. The computer-executable instructions may be executed by various hardware components (e.g., the processor 804 and/or any of its circuits 820, 821, 822, 823) of the apparatus 802. The computer-executable instructions may be a part of various software programs and/or software modules.

The computer-readable medium 806 may include detection instructions 840. The detection instructions 840 may include computer-executable instructions configured for detecting a condition indicating that a GPU is in an unstable state while in a first wireless display mode. The computer-readable medium 806 may also include transmission instructions 841. The transmission instructions 841 may include computer-executable instructions configured for transmitting a GPU refresh request message and switching from the first wireless display mode to a second wireless display mode in response to detecting the condition. The computer-readable medium 806 may include reception instructions 842. The reception instructions 842 may include computer-executable instructions configured for receiving data sufficient to reset the GPU from the unstable state to a stable state at a RAP in a trace of the GPU commands and after transmitting the GPU refresh request message. The computer-readable medium 806 may include control instructions 843. The control instructions 843 may include computer-executable instructions configured for switching from the second wireless display mode to the first wireless display mode after receiving the data. The control instructions 843 may also include computer-executable instructions configured for utilizing a GEE in the first wireless display mode and Miracast in the second wireless display mode.

The foregoing description provides a non-limiting example of the computer-readable medium 806 of the apparatus 802. Although various computer-executable instructions (e.g., computer-executable code) have been described above, one of ordinary skill in the art will understand that the computer-readable medium 806 may also include various other computer-executable instructions (not shown) that are in addition and/or alternative(s) to instructions 840, 841, 842, 843. Such other computer-executable instructions (not shown) may be configured for performing any one or more of the functions, methods, processes, features and/or aspects described herein.

The memory 814 may include various memory modules. The memory modules may be configured to store, and have read therefrom, various values and/or information by the processor 804, or any of its circuits 820, 821, 822, 823. The memory modules may also be configured to store, and have read therefrom, various values and/or information upon execution of the computer-executable code included in the computer-readable medium 806, or any of its instructions 840, 841, 842, 843. The memory 814 may include trace information 830. For example, the trace information 130 may be stored or maintained in a graphics library of the sink 104. The trace information 830 may exist in various formats and/or file configurations without deviating from the scope of the present disclosure. The memory may also include RAP information 831. As described above, a RAP refers to a mark, marker, and/or any other suitable indicator at one or more portions, positions, or locations of the trace 602. At each RAP, the sink 104 may receive data 616 that is sufficient to reset a GPU (e.g., the remote GPU 124 of the sink 104). In some configurations, the data 616 for resetting the remote GPU 124 of the sink 104 may include information associated with the textures, shaders, vertices, and/or any other suitable display attributes.

One of ordinary skill in the art will also understand that the apparatus 802 may include alternative and/or additional features without deviating from the scope of the present disclosure. In accordance with various aspects of the present disclosure, an element, or any portion of an element, or any combination of elements may be implemented with a processing system that includes one or more processors 804. Examples of the one or more processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 816 and bus interface 808. The bus 816 may include any number of interconnecting buses and bridges depending on the specific application of the processing system and the overall design constraints. The bus 816 may link together various circuits including the one or more processors 804, the memory 814, and the computer-readable medium 806. The bus 816 may also link various other circuits such as timing sources, peripherals, voltage regulators, and power management circuits, which are well known in the art.

The one or more processors 804 may be responsible for managing the bus 816 and general processing, including the execution of software stored on the computer-readable medium 806. The software, when executed by the one or more processors 804, causes the processing system to perform the various functions described below for any one or more apparatuses. The computer-readable medium 806 may also be used for storing data that is manipulated by the one or more processors 804 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may also include, by way of example, a carrier wave, a transmission line, and any other suitable medium for transmitting software and/or instructions that may be accessed and read by a computer. The computer-readable medium 806 may reside in the processing system, external to the processing system, or distributed across multiple entities including the processing system. The computer-readable medium 806 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. An apparatus configured for wireless display, the apparatus comprising:
   a transceiver;
   a memory;
   a graphics processing unit (GPU); and
   at least one processor communicatively coupled to the transceiver, the memory, and the GPU, wherein the at least one processor and the memory are configured to:
   detect a condition indicating that the GPU is in an unstable state while in a first wireless display mode;
   in response to detecting the condition, transmit a GPU refresh request message and switch from the first wireless display mode to a second wireless display mode;
   after transmitting the GPU refresh request message, at a random access point (RAP) in a trace of GPU commands, receive data sufficient to reset the GPU from the unstable state to a stable state; and
   switch from the second wireless display mode to the first wireless display mode after receiving the data.

2. The apparatus of claim 1, wherein the condition indicating that the GPU is in the unstable state exists when a number of lost packets of the GPU commands exceeds a threshold number of lost packets of the GPU commands.

3. The apparatus of claim 1, wherein the GPU refresh request message comprises information requesting the data sufficient to reset the GPU at an upcoming RAP in the trace of the GPU commands.

4. The apparatus of claim 1, wherein the data sufficient to reset the GPU is independent of other data associated with another RAP in the trace of the GPU commands.

5. The apparatus of claim 1, wherein the at least one processor and the memory are further configured to switch from the second wireless display mode to the first wireless display mode when a timestamp of a packet associated with the second wireless display mode is the same as a timestamp of a packet associated with the first wireless display mode.

6. The apparatus of claim 1, wherein a display quality of the second wireless display mode is less than a display quality of the first wireless display mode.

7. The apparatus of claim 1, wherein the at least one processor and the memory are further configured to utilize a Graphics Engine Entity (GEE) in the first wireless display mode and Miracast in the second wireless display mode.

8. The apparatus of claim 1, wherein the GPU commands comprise at least one of OpenGL commands or DirectX commands.

9. A method for wireless display, the method comprising:
   detecting a condition indicating that a graphics processing unit (GPU) is in an unstable state while in a first wireless display mode;
   in response to detecting the condition, transmitting a GPU refresh request message and switching from the first wireless display mode to a second wireless display mode;
   after transmitting the GPU refresh request message, at a random access point (RAP) in a trace of GPU commands, receiving data sufficient to reset the GPU from the unstable state to a stable state; and
   switching from the second wireless display mode to the first wireless display mode after receiving the data.

10. The method of claim 9, wherein the condition indicating that the GPU is in the unstable state exists when a number of lost packets of the GPU commands exceeds a threshold number of lost packets of the GPU commands.

11. The method of claim 9, wherein the GPU refresh request message comprises information requesting the data sufficient to reset the GPU at an upcoming RAP in the trace of the GPU commands.

12. The method of claim 9, wherein the data sufficient to reset the GPU is independent of other data associated with another RAP in the trace of the GPU commands.

13. The method of claim 9, wherein the switch from the second wireless display mode to the first wireless display mode occurs when a timestamp of a packet associated with the second wireless display mode is the same as a timestamp of a packet associated with the first wireless display mode.

14. The method of claim 9, wherein a display quality of the second wireless display mode is less than a display quality of the first wireless display mode.

15. The method of claim 9, further comprising utilizing a Graphics Engine Entity (GEE) in the first wireless display mode and Miracast in the second wireless display mode.

16. The method of claim 9, wherein the GPU commands comprise at least one of OpenGL commands or DirectX commands.

17. A computer-readable medium configured for wireless display, the computer-readable medium comprising computer-executable instructions configured for:

detecting a condition indicating that a graphics processing unit (GPU) is in an unstable state while in a first wireless display mode;

in response to detecting the condition, transmitting a GPU refresh request message and switching from the first wireless display mode to a second wireless display mode;

after transmitting the GPU refresh request message, at a random access point (RAP) in a trace of GPU commands, receiving data sufficient to reset the GPU from the unstable state to a stable state; and switching from the second wireless display mode to the first wireless display mode after receiving the data.

18. The computer-readable medium of claim 17, wherein the condition indicating that the GPU is in the unstable state exists when a number of lost packets of the GPU commands exceeds a threshold number of lost packets of the GPU commands.

19. The computer-readable medium of claim 17, wherein the GPU refresh request message comprises information requesting the data sufficient to reset the GPU at an upcoming RAP in the trace of the GPU commands.

20. The computer-readable medium of claim 17, wherein the data sufficient to reset the GPU is independent of other data associated with another RAP in the trace of the GPU commands.

21. The computer-readable medium of claim 17, wherein the switch from the second wireless display mode to the first wireless display mode occurs when a timestamp of a packet associated with the second wireless display mode is the same as a timestamp of a packet associated with the first wireless display mode.

22. The computer-readable medium of claim 17, wherein a display quality of the second wireless display mode is less than a display quality of the first wireless display mode.

23. The computer-readable medium of claim 17, wherein the computer-executable instructions are further configured for utilizing a Graphics Engine Entity (GEE) in the first wireless display mode and Miracast in the second wireless display mode.

24. The computer-readable medium of claim 17, wherein the GPU commands comprise at least one of OpenGL commands or DirectX commands.

25. An apparatus configured for wireless display, the apparatus comprising:

means for detecting a condition indicating that a graphics processing unit (GPU) is in an unstable state while in a first wireless display mode;

means for transmitting a GPU refresh request message and switching from the first wireless display mode to a second wireless display mode in response to detecting the condition;

means for receiving data sufficient to reset the GPU from the unstable state to a stable state at a random access point (RAP) in a trace of GPU commands and after transmitting the GPU refresh request message; and means for switching from the second wireless display mode to the first wireless display mode after receiving the data.

26. The apparatus of claim 25, wherein the condition indicating that the GPU is in the unstable state exists when a number of lost packets of the GPU commands exceeds a threshold number of lost packets of the GPU commands.

27. The apparatus of claim 25, wherein:

the GPU refresh request message comprises information requesting the data sufficient to reset the GPU at an upcoming RAP in the trace of the GPU commands; and the data sufficient to reset the GPU is independent of other data associated with another RAP in the trace of the GPU commands.

28. The apparatus of claim 25, wherein the means for switching is configured to switch from the second wireless display mode to the first wireless display mode when a timestamp of a packet associated with the second wireless display mode is the same as a timestamp of a packet associated with the first wireless display mode.

29. The apparatus of claim 25, wherein a display quality of the second wireless display mode is less than a display quality of the first wireless display mode.

30. The apparatus of claim 25, further comprising means for utilizing a Graphics Engine Entity (GEE) in the first wireless display mode and Miracast in the second wireless display mode, wherein the GPU commands comprise at least one of OpenGL commands or DirectX commands.

* * * * *